United States Patent Office 3,392,179
Patented July 9, 1968

3,392,179
PREPARATION OF DIORGANOTIN MALEATES
Lewis B. Weisfeld, Highland Park, and Carl W. Pause, Spotswood, N.J., assignors to Carlisle Chemical Works, Inc., Reading, Ohio
No Drawing. Filed Apr. 15, 1965, Ser. No. 448,270
2 Claims. (Cl. 260—429.7)

ABSTRACT OF THE DISCLOSURE

Organotin salts of dicarboxylic acids are obtained directly in form of prills by agitating an organotin oxide with a suspension of a molten dicarboxylic acid anhydride in an organic liquid in which the reaction components are substantially insoluble.

This invention relates to a process for preparing hydrocarbyltin salts of hydrocarbon dicarboxylic acids, particularly of organotin maleates.

Organotin maleates have been essentially prepared by cofusion of an organotin oxide and maleic anhydride. The procedure was tenuous. Dibutyltin oxide was added slowly to molten maleic anhydride. Even though the oxide was finely powdered, it would tend to agglomerate and each lump would form a protective sheath of dibutyltin maleate about it, impeding further reaction. The viscous reaction mixture had to be stirred and heated until nearly homogeneous, then drained off into crystallization trays. Sometimes over two weeks of settling was required in order that the material completely crystallize and achieve the correct hardness for grinding. Often it would retain surface stickiness even after this time, as well as soft masses, and grinding would be exceedingly difficult.

In order to avoid these drawbacks, it has also been proposed to react maleic anhydride or similar anhydrides with an organotin oxide in an inert organic solvent such as benzene or toluene. This process requires stripping the solvent in vacuo to obtain the desired organotin ester, which has then to be pulverized for use as a stabilizer for vinyl resins or other purposes.

It is a principal object of the invention to provide a method for producing organotin maleates and organotin salts or esters of other dicarboxylic acids directly in form of grains or prills.

Other objects and advantages will be apparent from a consideration of the specification and claims.

According to our process, maleic anhydride is suspended in an organic liquid which is not a solvent therefor, such as heptane or any petroleum fraction of a suitable boiling range, and heated and agitated therein at a temperature in the range of 60 to 120° C. until a molten dispersion of the maleic anhydride in the liquid is obtained. Then an organotin oxide is rapidly added in stoichiometric amounts, and the "oil phase" is converted to a dispersion of the molten organotin maleate. Agitation is continued as the reaction medium is cooled, and the organotin maleate solidifies as a uniform prill. On stopping agitation, the prill settles to the bottom of the reactor and the liquid is decanted off. The prill is filtered, and dried rapidly because of its relatively small surface area. It is now ready for subsequent use as it is or may be ground further to a fine powder.

Suitable organotin oxides are those of the formula RR'SnO wherein R and R' are the same or different hydrocarbon radicals. Suitable radicals are alkyl groups such as butyl, hexyl, octyl, etc.; R and/or R' may be also aryl groups such as phenyl, aralkyl groups such as benzyl, or cycloaliphatic groups such as cyclohexyl. Also substituted aliphatic or aromatic groups or unsaturated aliphatic radicals may be substituted for the R or R' groups in the organotin oxide.

Instead of maleic anhydride, other anhydrides of saturated or unsaturated aliphatic or aromatic dicarboxylic acids having suitable melting points, e.g. in the range of 50 to 250° C., such as succinic anhydride or the anhydrides of substituted succinic acids may be used, in organic liquids in which they are not or only little soluble and which have a boiling point sufficiently higher than the melting point of the anhydride.

The invention will be further illustrated by the following example:

EXAMPLE 113.0 pounds of maleic anhydride and 332.0 pounds of isooctane were charged into a 300 gallon vented and jacketed trunnion kettle with a full sweep agitator. The mixture was heated to 175° F. (80° C.) under agitation. 287.0 pounds of dibutyltin oxide were then added rapidly, maintaining a temperature of 170–175° F. (75–80° C.) by heating. When addition was complete, the slurry was heated to 212–220° F. (100–105° C.) and maintained at that temperature with maximum agitation for forty-five minutes. The supernatant liquid was decanted into open head drums for reuse. The solid was then transferred to a ceramic filter, pressed into cake, then finally dried at 160–175° F. (70–80° C.). The product was a white solid analyzing for 34.0% tin and furnishing a clear, water-white melt at 125–135° C.

We claim:
1. A method of preparing diorganotin salts of dicarboxylic acids directly in form of grains or prills comprising contacting an organotin oxide of the formula RR'SnO, wherein R and R' are hydrocarbon radicals containing only carbon and hydrogen with a suspension of a molten anhydride of a dicarboxylic acid of the formula $R^3C_2O_3$ wherein $R^3$ is a divalent hydrocarbon radical, in an organic liquid in which said anhydride and the organotin salt formed are substantially insoluble, cooling the reaction mixture and agitating it during such cooling until the organotin salt has solidified as prills.

2. A method of preparing dialkyl tin salts of maleic acid comprising contacting at a temperature of about 60 to 120° C. a dialkyl tin oxide, whose alkyl groups have 2 to 12 carbon atoms, with molten maleic anhydride suspended in an alkane having a boiling point above 60° C., cooling the reaction mixture and agitating it during such cooling until the obtained dialkyltin maleate has solidified as prills.

References Cited
UNITED STATES PATENTS 2,838,554   6/1958   Gloskey _____ 260—429.7

TOBIAS E. LEVOW, *Primary Examiner.*

W. F. W. BELLAMY, *Assistant Examiner.*